Sept. 28, 1971 CLAUS-CHRISTIAN COBARG 3,608,306
PLANE INDICATOR SETTING ARRANGEMENT
Filed Sept. 22, 1969 2 Sheets-Sheet 1

INVENTOR
CLAUS-CHRISTIAN COBARG

ATTORNEY

United States Patent Office 3,608,306
Patented Sept. 28, 1971

3,608,306
PLANE INDICATOR SETTING ARRANGEMENT
Claus-Christian Cobarg, Steinbach, Taunus, Germany, assignor to Braun Aktiengesellschaft, Frankfurt am Main, Germany
Filed Sept. 22, 1969, Ser. No. 859,643
Claims priority, application Germany, Sept. 23, 1968, P 17 98 304.9
Int. Cl. G04b 19/00
U.S. Cl. 58—126
9 Claims

ABSTRACT OF THE DISCLOSURE

A setting arrangement for plane or leaf indicators used in conjunction with clocks to present a digital display of the time. The leaf or plane indicators are mounted on a drum which is driven from the clock mechanism, through a coupling with coupling pins. The coupling pins are mounted on gears of the coupling. One of the gears is mounted on a shaft to which a setting or adjustment knob is secured. By rotating the knob, it is possible to adjust the instant of contact between the coupling pins, and thereby the engagement of coupling. A scale surrounds the setting knob for realizing accurate settings of the indicator. Setting of the knob may be in the forward or reverse direction, and a blocking mechanism becomes operational when the reverse rotation of the knob exceeds a predetermined limit.

BACKGROUND OF THE INVENTION

The present invention resides in an arrangement for the setting of leaf indicating mechanisms or plane indicators used in conjunction with timing mechanisms.

For the purpose of indicating the time or data from timing mechanisms, leaf indicating mechanisms or plane indicators are used. Such applications may be found, for example, in date indicators or in digital clocks for indicating the minutes and hours of time.

When such indicating arrangements were used, heretofore, it was necessary to set the indicating mechanisms through motion directed only in the forward direction, since the leaf or plane indicating mechanism was not settable in the reverse direction, due to the presence of the reverse motion blocking mechanism or member. As a result, the setting of these mechanisms involved traversing often the entire indicating range. Thus, it was at all times necessary to take the longer path for setting the mechanism if the shorter path meant having to carry out the adjustment in the reverse direction, since such reverse adjustment was not possible.

Accordingly, it is an object of the present invention to provide leaf indicating mechanisms or plane indicators which may be set without requiring a considerable effort, as in involved in the setting of the mechanism heretofore. It is a particular object of the present invention that such leaf mechanisms or plane indicators be settable without having to traverse the entire range of values for the purpose of realizing the correct setting.

The preceding object of the present invention is achieved by providing an engageable and adjustable coupling between the leaf mechanism or plane indicator, and the mechanism for driving this leaf mechanism.

In an advantageous design, the coupling consists of two wheels or gears which become engaged through coupling pins. In a preferred design, the point or location of the engagement of the coupling is adjustable from the exterior of the mechanism. In accordance with the present invention, such adjustment of the engagement of the coupling is achieved through the setting of a knob in relation to a scale calibrated or graduated for predetermined intervals. This scale is rotatable with respect to the knob, and is sub-divided with graduations or calibrations, depending on the accuracy desired.

SUMMARY OF THE INVENTION

An indicator setting arrangement in which a plurality of flat-shaped leaf indicators or plane indicators are mounted on a drum driven through a timing mechanism. The leaf indicators are used to indicate the time digitally. Mechanically connected between the leaf indicators and the timing or clock mechanism, is a clutch provided with engaging pins. This clutch or coupling is made to engage through contact between the coupling pins. Through means of a setting knob mounted on the exterior of the arrangement, the instant at which engagement between the coupling pins is established, may be made variable. The coupling pins are carried by rotatable members in the form of gears. A scale is provided in conjunction with the setting knob for the purpose of obtaining accurate time settings. Setting of the leaf indicators, i.e., and adjustment of the mechanism so that the leaf indicators will indicate the correct time, may be achieved through either forward or reverse rotational motions of the setting knob. A blocking mechanism prevents reverse motion of the knob when a predetermined limit is being exceeded.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
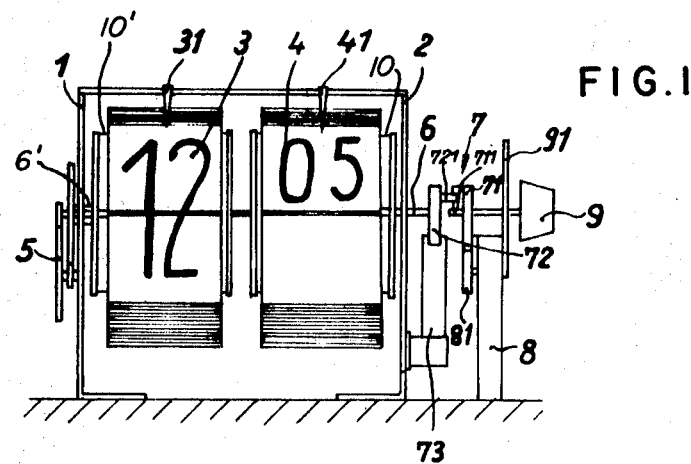
FIG. 1 is an elevational front view of a leaf indicating mechanism for a digital clock with provision for setting from the exterior of the clock.

Referring to the drawing and in particular to FIG. 1, the indicating mechanisms 3 and 4 of a digital clock are supported between two brackets 1 and 2. The indicating mechanism 3 and 4 provide indications through leaf indicators which are flat-shaped or are constructed in the form of flaps, for example. The indicating mechanism of the digital clock is connected to a clock mechanism 8 through a shaft 6 and a coupling 7 whereas the indicating mechanism 3 is connected to the shaft 6 through the speed reducing arrangement 5. Springs 31 and 41 are mounted on a cross member straddling the brackets 1 and 2, and hold the individual indicating leaves in place. At the proper instant of time, these springs 31 and 41 allow the respective leaves to drop, as a result of the offset design of the leaf mechanism for the units 3 and 4.

The coupling between the leaf mechanism shaft 6 and the clock mechanism 8 is accomplished through a gear 81 in mesh with a gear 71. A coupling pin 711 is mounted on or secured to the gear 71 and cooperates with another coupling pin 721 secured to a further gear 72 mounted on the shaft 6. A setting or adjusting knob member 9 is mounted on or linked to the gear 71. This setting knob 9 serves to set the clock mechanism 8.

If the preceding clock is to be set back, then the clock mechanism 8 becomes turned in the reverse direction through the setting knob 9. Control over reverse setting, is realized through scale 91 which is arranged at the exterior of the housing for this digital clock. By rotating the knob 9 in the reverse direction, the gears 71 and 72 become disengaged. With this mechanical relationship in which the gears 71 and 72 are not in driving connection, the leaf mechanism remains stationary or static, until the gear 71 becomes again drivingly connected with the gear 72. Thus, for the leaf mechanism to operate, it is necessary that gears 71 and 72 be drivingly connected.

Figure 2:
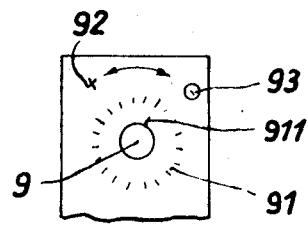
FIG. 2 is a partial view of the indicating scale and setting knob used for setting the leaf indicators of the indicating mechanism in FIG. 1.

FIG. 2 shows the design of the scale 91 of the digital clock, which is adapted, for example, to indicate minutes, and have provision preferably for plus and minus signs 92 and 93, respectively. Thus, for the purpose of indicating minutes, the scale may be sub-divided in corresponding increments so that individual minutes or minute intervals may be readily read from the scale 91.

When the setting knob or adjusting knob 9 is rotated too far in reverse direction by mistake, for example, so that the gear 71 would again be drivingly connected with the gear 72, then the conventional reverse-movement blocking member 73 becomes operable. The blocking member 73 is the conventional member, in leaf mechanism clocks, used for blocking reverse motion of the clock by a predetermined amount.

The clock mechanism 8 possesses preferably a slip clutch or slip coupling, as conventionally used in clocks of the usual design.

Figure 3:
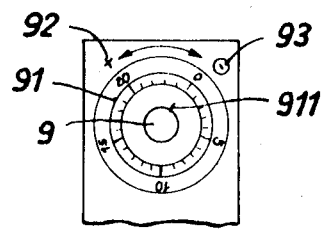
FIG. 3 is another embodiment of the scale and setting knob arrangement of FIG. 2.

FIG. 3 shows a further embodiment of the indicating scale 91 when, in conjunction therewith, the setting knob 9 is provided with a nose portion 911. The knob is in this case, also, settable in one-minute intervals through adaptation of the scale 91 for such minute settings. With the arrangement of FIG. 3, however, the scale may be so arranged that it is rotatable with respect to the setting knob 9. Thus, the scale in the configuration of FIG. 3, may be inscribed or imprinted upon a backing member which is physically rotatable with respect to the setting or adjusting knob 9.

Figure 4:
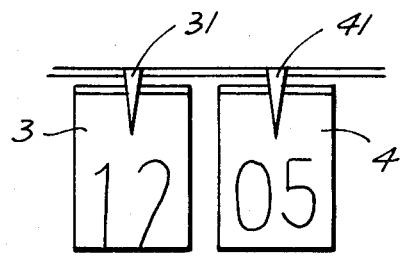
FIG. 4 is a partial plan view of the numbered leaves of the digital indicator in FIG. 1.
Figure 5:
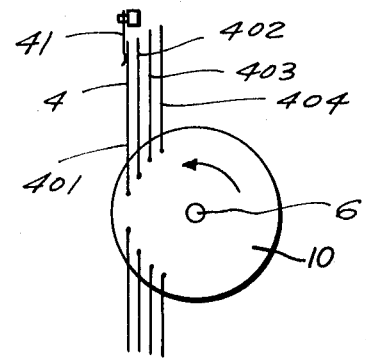
FIG. 5 is an end view of the numbered leaves of the digital indicator as they are held in place in FIG. 1.

To further clarify the arrangement of the present invention, the individual leaves of the digital clock are reproduced partially in FIGS. 4 and 5 for the purpose of illustrating the manner in which they are held in place and are actuated. Thus, the springs 31 and 41 serve to hold the leaves upright and in vertical planar condition. The drum 10 to which the leaves are connected is fixed to shaft 6 and is rotated in the direction of the indicating arrow, whereas the drum 10' to which the leaves 3 are connected is mounted on a hollow shaft 6' connected to the shaft 6 through an intermediate gear drive 5 which is used in the conventional clocks for movement as a function of time. As the drum 10 rotates, the leaves 401, 402, 403, etc., are pulled along with the drum and slip from underneath the spring 4, for example, so that they may afterward flap over. Thus, the leaves 3 and 4 are pivotally secured to the drums, and as the latter rotate, the leaves are pulled out from underneath the springs 31 and 41 so that they may rotate about their pivots on the drums 10 and 10' and thereby flap over under their own weight. With the flapping over of the leaves in this manner, through the rotation of the drums which are rotated as a function of time, the variations in time become indicated through the leaves which are visible. The springs 31 and 41 are firmly mounted in place.

Figure 6:
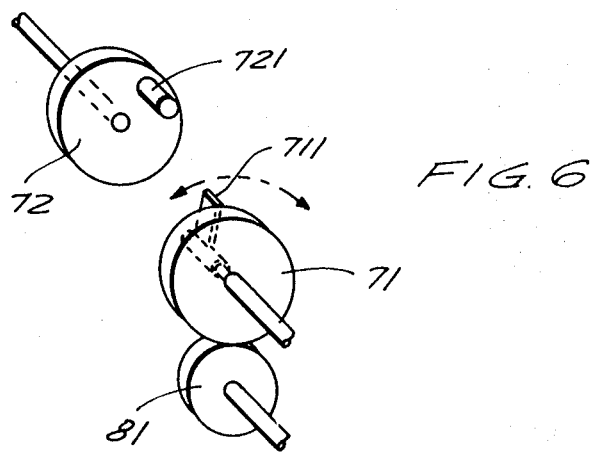
FIG. 6 is an isometric view of the coupling arrangement used to set the digital clock in FIG. 1.

The functional details of the coupling pins may be realized from the illustration of FIG. 6. The clock mechanism 8 in FIG. 1, drives the gear or pinion 81 which, in turn, meshes with the gear 71. The member 711 secured to the gear 71, drives the pin member 721 by being in contact therewith. As a result, the gear 71 will rotate the gear 72 through contact between the members 711 and 721. The drum or the hour indication and the gear drive 5 in FIG. 1, as well as the drum for the minute indication are rotated through the motion of the gear 72.

The above-described arrangement operates as follows:

During normal operation, the clock mechanism 8 will drive the gear 81 and the gear 71 meshing therewith which is fixedly mounted on the same shaft as the adjusting knob 9. During such forward drive, the coupling pins 711 and 721 respectively laterally projecting from the gear 71 and the wheel or gear 72 fixed to the shaft 6, will be in engagement with each other so that the drum 10 on which the minute indicating leaves 4 are mounted will be rotated by the shaft 6 whereas the drum 10' on which the hour indicating leaves 3 are mounted is driven from the shaft 6 over the speed reducing mechanism 5 at a correspondingly reduced speed.

If the time indicated by the figures on the leaves 3 and 4 should not be the correct time, an adjustment will be necessary and such an adjustment can be carried out by turning the knob 9 in one or the other direction. If the leaf mechanism indicates the time as being 12:05, as shown in FIG. 1, when the correct time would be, for instance, 12:06, the operator may simply turn the knob in forward direction until the leaf indicating the figure 0:05 slips beneath the spring 41 so that the leaf indicating mechanism will then show the correct time of 12:06. Such an adjustment would be the same as can be carried out with mechanism of this type known in the art.

However, if the leaf mechanism again shows the time as 12:05, as shown in FIG. 1, whereas the correct time should be only 12:04, it is evidently not possible to turn the shaft 6 in the reverse direction so that the leaf .04 would slip back under the spring 41. However, due to the coupling provided between the shaft on which the gear 71 is mounted and the driven shaft 6, it is evidently possible to turn the first-mentioned shaft by means of the knob 9 in the reverse direction through a desired angle, to thereby disengage the pins 711 and 712 of the coupling 7 from each other, which will stop driving of the shaft 6 by the clock mechanism 8 some time depending on the angle through which the shaft carrying the gear 71 is turned. This angle is chosen in such a manner that turning of the shaft 6 will start again after a lapse of such time for which the leaf mechanism has to be set.

The knob 9 in FIG. 1 rotates with the gear 71. When the clock is to be set or adjusted, it is necessary to note the position of the indicator 911 on the scale 91, and then to rotate the knob 9 in positive or negative directions, as desired.

For the purpose of simplifying this operation, a rotatable scale 91 is arranged in conjunction with the knob 9, in FIG. 3. When the clock is to be set or adjusted, the rotatable scale 91 is first turned until its zero marking is opposite the indicator or pointer 911 on the knob 9 and then the latter is turned relative to the adjusted scale in one or the other direction through a necessary angle indicated by the minute markings on the scale. With such use of the scale 91, therefore, it is possible to set knob 9 directly to the minute indications on the scale 91 which are readable without having to count lines as in FIG. 2.

It will be understood that each of the elements described above, or two or more together, may also find a useful application in other types of constructions differing from the types described above.

While the invention has been illustrated and described as embodied in a setting arrangement for leaf indicators, it is not intended to be limited to the details shown, since various modifications and structural changes may be made without departing in any way from the spirit of the present invention.

What is claimed as new and desired to be protected by Letters Patent is set forth in the appended claims.

I claim:

1. An indicator setting arrangement comprising leaf indicating means for indicating the time through display of at least one corresponding leaf with predetermined display information; a timing mechanism linked to said leaf indicating means so that said leaf indicating means indicates the time of said timing mechanism by displaying indicating leaf means with indicia adapted to convey information with respect to said time; support means for supporting said leaf indicating means and said timing mechanism; and transmission means between said timing mechanism and said leaf indicating means for driving the latter in correspondence with the movement of said timing mechanism, said transmission means including coupling means for transmitting a drive from said timing mechanism to said leaf indicating means during movement of said timing mechanism in one direction while permitting adjustment of said timing mechanism in the opposite direction without affecting the position of said leaf indicating means during such adjustment.

2. The indicator setting arrangement as defined in claim 1 wherein said coupling means comprises two rotatable members; and coupling pins secured to said rotatable members for engagingly coupling said two rotatable members through contact of said coupling pins.

3. The indicator setting arrangement as defined in claim 2 including setting means for setting the position of engagement of said coupling means through contact of said coupling pins with said two rotational members.

4. The indicator setting arrangement as defined in claim 3 including knob means mounted on said setting means for actuating manually said setting means.

5. The indicator setting arrangement as defined in claim 4 including scale means cooperating with said setting means, said knob means being rotatable relative to said scale means.

6. The indicator setting arrangement as defined in claim 5 wherein said scale means is rotatable with respect to said knob means.

7. The indicator setting arrangement as defined in claim 5 wherein said scale means has designations for indicating one-minute time intervals.

8. The indicator setting arrangement as defined in claim 5 wherein said scale means has plus and minus designations for designating forward and reverse settings of said knob means.

9. The indicator setting arrangement as defined in claim 1, wherein said leaf indicating means comprises a plurality of flat-shaped leaves mounted on a rotatable drum driven by said transmission means and carrying indicia for indicating the progressive passage of time as registered by said timing mechanism.

References Cited

UNITED STATES PATENTS

| | | | |
|---|---|---|---|
| 715,776 | 12/1902 | Fitch | 58—126 |
| 724,460 | 4/1903 | Fitch | 58—126X |
| 726,276 | 4/1903 | Fitch | 58—126X |
| 733,180 | 7/1903 | Fitch | 58—126X |
| 1,090,172 | 3/1914 | Shanks | 58—126 |
| 2,024,598 | 12/1935 | Powers | 40—35 |

FOREIGN PATENTS

| | | | |
|---|---|---|---|
| 65,487 | 8/1947 | Denmark | 58—126 |
| 446,203 | 3/1968 | Switzerland | 58—126 |

RICHARD B. WILKINSON, Primary Examiner

S. A. WAL, Assistant Examiner

U.S. Cl. X.R.

58—2